Jan. 31, 1961 R. L. JEPSEN 2,970,242

HIGH FREQUENCY ELECTRON TUBE APPARATUS

Filed March 30, 1956 2 Sheets-Sheet 1

ROBERT L. JEPSEN
INVENTOR.

BY Paul B. Hunter

Jan. 31, 1961 R. L. JEPSEN 2,970,242

HIGH FREQUENCY ELECTRON TUBE APPARATUS

Filed March 30, 1956 2 Sheets-Sheet 2

ROBERT L. JEPSEN
INVENTOR.

BY Paul B. Hunter

United States Patent Office 2,970,242
Patented Jan. 31, 1961

2,970,242

HIGH FREQUENCY ELECTRON TUBE APPARATUS

Robert L. Jepsen, Los Altos, Calif., assignor to Varian Associates, San Carlos, Calif., a corporation of California Filed Mar. 30, 1956, Ser. No. 575,161
2 Claims. (Cl. 315—5.39)

The present invention relates in general to high frequency apparatus and more specifically to novel apparatus for providing improved electrical performance of certain slow wave structures useful in velocity modulation type devices such as, for example, traveling wave tubes, klystrons, linear accelerators and the like.

The merit of any specific amplifier is usually defined as the product of its gain and bandwidth. The traveling wave tube amplifier has excellent bandwidth characteristics compared to other high frequency amplifiers, 10%–120% depending on center frequency and on power load. However, the traveling wave tube amplifier, heretofore, has been limited in gain for stability (self-oscillation) reasons. Traveling wave tube amplifier gains approximating 20 db–45 db are obtainable depending on bandwidth and power output without self-oscillation developing from the positive feedback of energy to the input end of the slow wave structure. Self-oscillation may be caused by the reflection of wave energy from mismatched slow wave structure terminations or by reflections from the load.

The present invention provides apparatus for bettering the gain-bandwidth product of velocity modulation type amplifiers by providing non-reciprocal wave energy coupling (transmits energy one way only) from one beam-field interaction section or stage to a subsequent beam-field interaction section. This allows higher gain to be realized without introducing instability (self-oscillation) arising from the positive feedback of energy.

Accordingly, the principal object of the present invention is to provide novel improved slow wave apparatus useful in velocity modulation type devices wherein the beam-field interaction of the apparatus is improved without the introduction of instability arising from self-oscillation of the apparatus.

One feature of the present invention is a novel improved velocity modulation type apparatus wherein non-reciprocal energy coupling means is provided between certain beam-field interaction sections or stages whereby the interaction between the beam and fields of the apparatus is greatly enhanced and self-oscillation tendencies greatly reduced.

Another feature of the present invention is a novel traveling wave tube having a folded line or interdigital slow wave structure wherein non-reciprocal attenuating means are provided along the slow wave structure whereby reflected wave energy is substantially attenuated thereby greatly enhancing the amplifier merit and stability of the tube apparatus.

Figure 1:
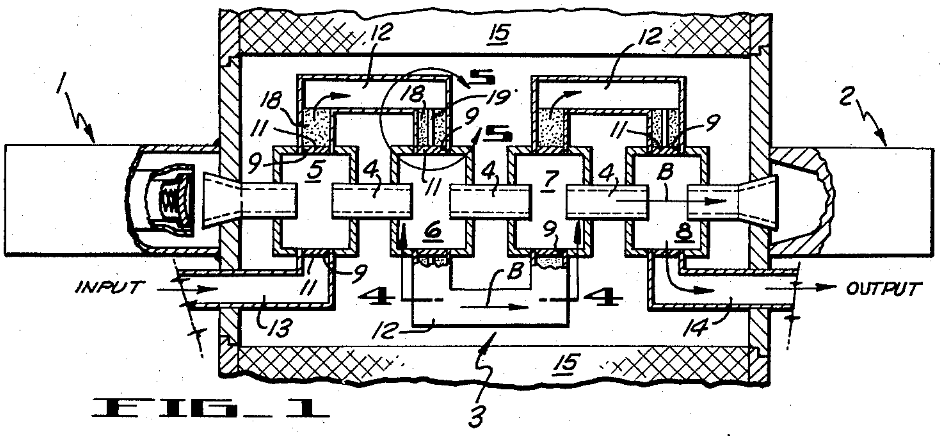
Figure 2:
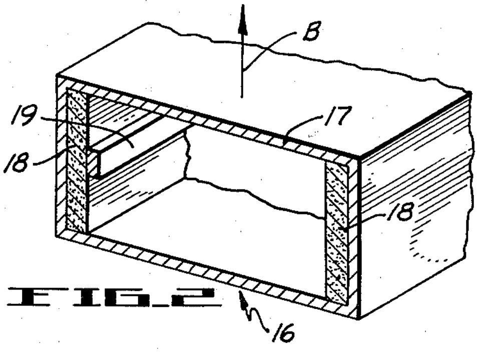
Figure 3:
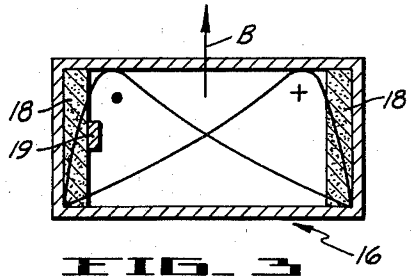
Figure 5:
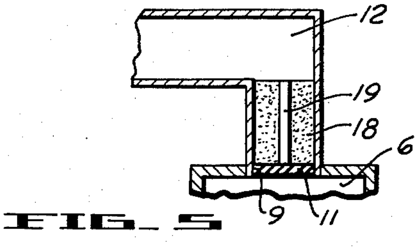
Figure 4:
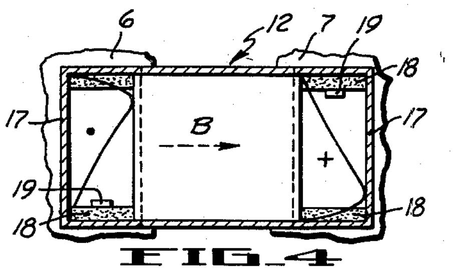

These and other features and advantages of the present invention will be more apparent after a perusal of the following specification taken in connection with the accompanying drawings wherein, Fig. 1 is an elevation view partly in longitudinal cross section of a novel tube apparatus of the present invention, Fig. 2 is an enlarged perspective view of a section of non-reciprocal waveguide, Fig. 3 is an end view of the structure of Fig. 2, Fig. 4 is an enlarged cross sectional view of a portion of the structure of Fig. 1 taken along line 4—4 in the direction of the arrows, Fig. 5 is an enlarged cross sectional view of a portion of the structure of Fig. 1 encircled by the line 5—5.

Figure 6:
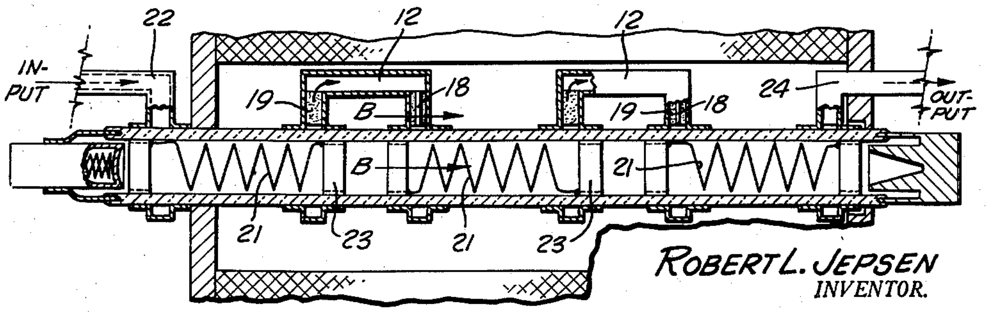
Figures 7, 8, 9:
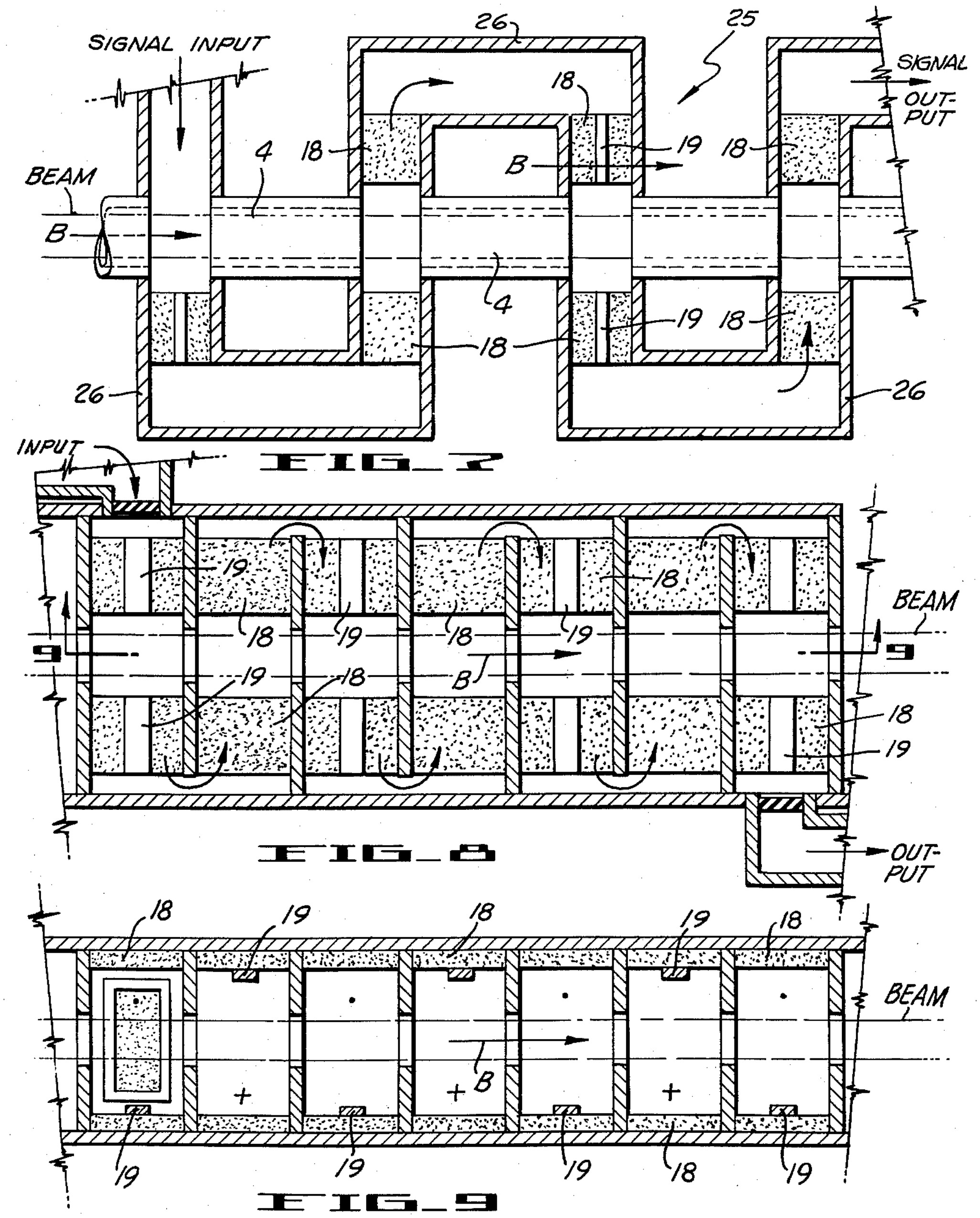

Fig. 6 is an elevation view partly in longitudinal cross section of a novel multi-section traveling wave tube which embodies the present invention, Fig. 7 is a longitudinal cross sectional view of a novel folded-line slow wave R.F. structure, Fig. 8 is a longitudinal cross sectional view of a novel improved interdigital slow wave structure, and Fig. 9 is a cross sectional view of the structure of Fig. 8 taken along line 9—9 in the direction of the arrows.

Similar characters of reference are used in all of the above figures to indicate corresponding parts.

Referring now to Fig. 1, there is depicted a hybrid amplifier incorporating the novel improvements of the present invention. A klystron modified, in the present manner, by providing additional non-reciprocal wave energy coupling between successive cavity resonators, transforms the klystron amplifier into essentially a novel type of traveling wave tube. As such its bandwidth for a given length and given gain is inherently higher than obtainable from an unmodified klystron of the same length and gain. Although it is not necessary for the co-efficient of coupling between successive resonators to exceed the value of critical coupling the larger the degree of coupling the more the characteristics of the device approach those of a traveling wave tube. If the added energy coupling means between successive cavity resonators allows the transfer of energy in a backward direction (toward the input end) energy may be fed back to the input of the apparatus in the proper phase relationship to produce self-oscillation resulting in instability of the device as an amplifier. To avoid self-oscillation, the additional wave energy coupling means has been made non-reciprocal thereby preventing instability from arising in use.

A cathode assembly 1 provides a ready source of electrons to make up a beam. A collector assembly 2 provides a means for catching the electrons and dissipating their kinetic energies. An R.F. section 3 is interposed in axial alignment between the cathode assembly 1 and the collector assembly 2 and provides means for accelerating the emitted electrons into a beam and obtaining electromagnetic interaction therewith.

The R.F. section 3 includes a plurality of drift tube sections 4 mutually spaced apart in axial alignment with the tube apparatus. A plurality of cavity resonators 5, 6, 7 and 8 are successively arranged and interconnect the spaced apart drift tube sections 4. The spaces between the free end portions of the aligned drift tube sections 4 provide the beam-field interaction spaces of the cavity resonators.

A plurality of coupling irises 9 are provided in the side walls of the cavity resonators, two irises per resonator. A plurality of wave-energy permeable windows 11 as of, for example, alumina ceramic seal off the coupling irises 9 thereby permitting a vacuum to be maintained within the spaces defined by the outer walls of the cathode assembly 1, drift tube sections 4, cavity resonators 5, 6, 7 and 8 and collector assembly 2.

The location of the wave permeable windows 11 is not critical. They may be placed at any one of a number of locations; for example, hollow cylindrical windows might be placed surrounding the drift tube and joined to the end walls of the cavity resonators.

A plurality of non-reciprocal wave energy transmission lines 12 interconnect, through the coupling irises 9, the successive cavity resonators. An input waveguide 13 is connected to the input cavity resonator 5 through iris 9 and window 11. An output waveguide 14 is connected to the output cavity resonator 8. A beam focusing solenoid assembly 15 surrounds the R.F. section and provides a strong axial magnetic field B. (A permanent magnet could be used in place of the electromagnet.) The magnetic field need only be axial; it can have a direction either toward the collector 2 from the cathode assembly 1 or a direction 180° to this direction. The present invention will be explained utilizing the former direction of magnetic field. If the latter direction were utilized the non-reciprocal transmission means would have to be arranged accordingly.

The non-reciprocal transmission line 12 (Fig. 4) may be of many different forms, the requirement being only that it have sufficient pass band and be a substantially non-reciprocal transmission line. Any one of a number of non-reciprocal devices can be used. One such non-reciprocal device is a field displacement resistive-sheet isolator 16 as shown in Fig. 2.

The resistive-sheet isolator 16 comprises a length of rectangular waveguide 17. Two ferrite sheets 18 as of, for example, Feramic J. are carried within the waveguide. One ferrite sheet is disposed along each short side wall of the waveguide 17. A resistive strip 19 as of, for example, any conventional resistance card material, is disposed along one of the ferrite strips 18. When the ferrite-loaded waveguide is transversely magnetized by a strong magnetic field B, the fundamental $TE_{10}$ mode configuration is displaced as shown in Fig. 3. The ingoing or forward-traveling wave is displaced to the right. The reflected or backward-traveling wave is displaced to the left. This action places the strong electric fields of the backward-traveling wave in the area of the resistive strip 19. Since the resistive strip 19 is quite lossy the backward-traveling wave is strongly attenuated resulting in a high loss ratio of backward-traveling energy over forward-traveling energy.

In operation, a signal is fed to the input cavity resonator 5. Electromagnetic fields are set up within the cavity resonator and interact with the electron beam to thereby velocity modulate the beam. A certain fraction of the energy within the input resonator is coupled therefrom through the non-reciprocal transmission line 12 to the second cavity resonator 6 where the electromagnetic fields therein interact with the beam to further velocity modulate the beam. Likewise, a certain fraction of the electromagnetic energy contained within the second cavity resonator 6 is coupled outwardly therefrom through a second section of non-reciprocal transmission line 12 to the third cavity resonator 7 (Fig. 4) and so on until the last cavity resonator 8. Output energy is coupled from the last cavity resonator 8 to the load via standard waveguide 14.

The beam focusing field B provides the transverse magnetizing field for the individual sections of non-reciprocal transmission line 12 such that energy is easily propagated in the forward direction, that is, for example, from input cavity resonator 5 to cavity resonator 6 while energy which might be reflected from cavity resonator 6 to cavity resonator 5 is strongly attenuated. This attenuation feature of the non-reciprocal transmission lines 12 prevents the feedback of energy to the initial stages of the hybrid amplifier thereby averting unwanted self-oscillation.

Referring now to Fig. 6 there is shown a novel improved traveling wave tube amplifier incorporating the novel features of the present invention. The complete structure and operation of the novel traveling wave tube will not be fully described here as it is deemed well understood in the art. It will suffice to confine the description to the novel features of the device.

A plurality of slow wave structures 21 such as, for example, helices are successively arranged for interaction with a beam of electrons. Non-reciprocal transmission lines 12 as, for example, a resistive-sheet field displacement isolator 16 (Fig. 2) previously described supra, interconnect successive slow wave structures 21.

As in the previously described hybrid amplifier (Fig. 1) the beam focusing field B supplies the necessary transverse magnetizing field for the resistive-sheet field displacement type isolator 16 (Fig. 2) forming the non-reciprocal transmission lines 12 (Fig. 6).

In operation, an input signal is supplied to the first slow wave structure via a waveguide 22. The signal wave is propagated along the first slow wave structure and interacts with the beam of electrons, gaining in amplitude by receiving energy therefrom. When the signal wave arrives at the termination 23 of the first slow wave structure the wave is radiated into the non-reciprocal transmission line 12 and is propagated therethrough to the beginning of the next slow wave structure. It is necessary at the confluence of the wave and beam at the beginning of the second slow wave structure 21 that the wave and the beam be combined in phase. This requires that the traveling wave in transmission line 12 have a phase delay with respect to the phase of the current modulation on the beam of $2\pi n$ where $n$ may have any plus or minus integer value including zero.

After the signal wave has been re-combined with the beam, the traveling wave electron beam interaction, described in reference to the first slow wave structure, is repeated in the second and third slow wave structures successively until the wave reaches the termination of the last slow wave structure. Thence the wave is radiated into a waveguide 24 and propagated to a load.

The non-reciprocal transmission lines 12 which interconnect successive slow wave structures 21 or beam-field interaction stages serve to attenuate any reflected or backward traveling waves thereby preventing the feedback of energy which would cause self-oscillation or reduce gain.

Referring now to Fig. 7 there is shown a traveling wave tube amplifier utilizing a novel folded-line slow wave structure of the present invention. The novel folded-line type traveling wave tube will not be described in detail except as it pertains to the present invention. It is deemed that the standard folded-line traveling wave tube is well-known in the art. The R.F. section 25 is shown in Fig. 7. A drift tube 4 extends longitudinally of the tube apparatus. A hollow waveguide transmission line 26 is folded such that it alternately traverses the drift tube 4 and hence the beam path at substantially right angles thereto. An axial beam focusing magnetic field B extends longitudinally of the tube apparatus.

Non-reciprocal attenuating means are disposed in the folded line 26 which interconnects the successive beam-field interaction or coupling spaces. For example, in the structure of Fig. 7 resistive-sheet field-displacement isolator 16 (Fig. 2) may be utilized with the folded line 26 forming the waveguide portion 17 (Fig. 2). Here again the beam focusing field B is utilized to provide the transverse magnetizing field B. When the field-displacement resistive-sheet isolator 16 (Fig. 2), as described supra, is used it will be found that the resistive strip 19 will alternate from one side of the folded line to the other in successive transverse crossings of the beam.

The ferrite sheets 18 of the resistive-strip field-displacement isolator 16 (Fig. 2) produce a transverse field displacement of the propagating electromagnetic waves. In order to place the strong electric field of the forward propagating wave in transverse alignment with the beam-field interaction or coupling spaces of the device, for producing more beam-field interaction coupling, portions of the ferrite sheets 18 may be eliminated in close proximity to the beam-field interaction spaces as by being terminated short of such spaces or the successive structures may be offset with respect to each other such that the strong electric field of the forward propagating wave is in axial alignment with the beam in successive interaction sections.

Wave permeable vacuum-tight windows may be disposed, as desired, either at the input and output ends of the folded line 26 or within the folded line 26 outwardly of the beam.

In operation, an input electromagnetic signal is applied at the left hand side of the structure of Fig. 7 and is amplified by receiving energy from the beam as the signal wave traverses the length of the folded line 26. A greatly amplified wave emerges from the right hand side of the structure and is propagated to a load. As in the modified klystron of Fig. 1 the non-reciprocal isolator 16 (Fig. 2) prevents self-oscillation in the amplifier by attenuating any reflected waves which would otherwise provide positive feedback.

Referring now to Figs. 8 and 9 there is shown a traveling wave the tube incorporating a novel interdigital slow wave structure of the present invention. From the preceding folded-line structure of Fig. 7 it can be seen that, in the limit of shorter longitudinal advances per transverse crossing of the beam by the transmission line 26 the folded-line structure of Fig. 7 approaches that of an interdigital slow wave structure as shown in Figs. 8 and 9.

Non-reciprocal attenuators are properly placed in the beam-field interaction sections to attenuate reflected waves. For example, a resistive-sheet field-displacement type isolator 16 (Fig. 2) may be utilized in each of the successive beam-field interaction sections whereby the forward propagating wave is allowed to propagate virtual uninhibited. Reflected or backward traveling energy is strongly attenuated in the properly placed resistive strips 19. Thus the tendency for self-oscillation is prevented. As can be seen from Figs. 8 and 9 the resistive strips 19 alternate from one side of the structure to the other in successive beam-field interaction sections.

As was pointed out in the preceding description the strong electric fields in the successive beam-field interaction sections will provide more interaction with the beam if the area of strong alternating electric field is in axial alignment with the beam. Alignment may be achieved by eliminating the non-reciprocal attenuators in close vicinity to the beam-field interaction spaces or by transversely offsetting the successive interaction structures with respect to each other.

In operation, wave energy is propagated into the slow wave structure at the left and is propagated through the structure successively transversely crossing the beam path. In each crossing of the beam the wave and beam interact in such a way that the amplitude of the wave grows, thus giving rise to amplification. The amplified signal is coupled from the last beam field interaction section and propagated to a load.

In some of the previously described structures the non-reciprocal attenuators have extended throughout the apparatus. It may be found, depending upon the application of the particular tube apparatus, that less attenuation in the backward direction is permissible. In this case the non-reciprocal means may be left out in certain portions of the apparatus. For example, in a traveling wave tube as described in Figs. 8 and 9 it may be found that the propensity for the device to oscillate is substantially reduced by providing backward attenuation only between every other beam-field interaction section.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electron tube apparatus, a folded hollow waveguide for transmitting wave energy therethrough, a plurality of aligned apertures provided in the side walls of said folded hollow waveguide and defining a path therethrough transverse to the direction of wave propagation within said folded waveguide, means for forming and projecting a beam of charged particles through said aligned apertures in said hollow waveguide for producing successive electromagnetic coupling between the electromagnetic fields within the hollow waveguide and the beam of charged particles passable therethrough, a ferrite slab disposed within said hollow waveguide and extending longitudinally therein, a strip of resistive material disposed within said hollow waveguide and extending longitudinally thereof, means for supplying a magnetic field having a susbtantial component directed in the plane of the ferrite slab for displacing wave energy within said hollow waveguide propagating in the backward direction toward said resistive strip to more strongly attenuate backward traveling wave than waves traveling in the opposite direction, and said ferrite slab and resistive strip members being terminated short of a plurality of the beam field interaction gaps defined by the intersection of said hollow waveguide and said beam path whereby strong electric fields of the wave energy propagating within said hollow waveguide in the region of the interaction gaps are not displaced transversely out of the beam path.

2. In an electron tube apparatus, a folded hollow waveguide for transmitting wave energy therethrough, a plurality of aligned apertures provided in the side walls of said folded hollow waveguide and defining a path therethrough transverse to the direction of wave energy propagation therewithin, means for forming and projecting a beam of charged particles through said aligned apertures in said hollow waveguide for producing successive electromagnetic coupling between the electromagnetic fields within said hollow waveguide and the beam of charged particles passable therethrough, means forming a non-reciprocal wave energy attenuator disposed within said hollow waveguide and extending longitudinally therein, means for applying a magnetic field to said non-reciprocal wave energy attenuator, means for displacing wave energy within said hollow waveguide propagating in the backward direction to more strongly attenuate backward traveling waves than waves traveling in the opposite direction, and said non-reciprocal wave energy attenuating means being terminated short of a plurality of the beam-field interaction spaces and thereby removing said attenuating means from that portion of the length of said hollow waveguide defined by the intersection of said hollow waveguide and said beam path whereby strong electric fields of the wave energy propagating within said hollow waveguide in the region of the beam-field coupling spaces are prevented from being displaced transversely out of the beam path.

References Cited in the file of this patent

UNITED STATES PATENTS

| | | |
|---|---|---|
| 2,644,930 | Luhrs et al. | July 7, 1953 |
| 2,733,305 | Diemer | Jan. 31, 1956 |
| 2,777,906 | Shockley | Jan. 15, 1957 |
| 2,798,183 | Sensiper | July 2, 1957 |
| 2,806,972 | Sensiper | Sept. 17, 1957 |
| 2,809,321 | Johnson et al. | Oct. 8, 1957 |
| 2,815,466 | Sensiper | Dec. 3, 1957 |
| 2,834,947 | Weisbaum | May 13, 1958 |
| 2,867,745 | Pierce | Jan. 6, 1959 |

OTHER REFERENCES

Bell System Technical Journal, January 1952, pages 22 to 26.

Bell System Technical Journal, vol. 34, No. 1, January 1955, published at AT & T Company, New York City, pages 64 to 71.

Proceedings of the IRE, vol. 43, No. 1, January 1955, pages 100 and 101.